United States Patent [19]

Matsumoto et al.

[11] 4,257,936
[45] Mar. 24, 1981

[54] SELF-BONDING SILICONE COMPOSITIONS

[76] Inventors: Yasuji Matsumoto, 887-35, Ohaza Ushizawa, Ohta-shi, Gunma prefecture; Bunjiro Murai, 1317-2 Iizuka-Cho, Ohta-shi, Gunma prefecture; Reeko Kawamura, 887-35, Ohaza Ushizawa, Ohta-shi, Gunma prefecture, all of Japan

[21] Appl. No.: 945,947

[22] Filed: Sep. 26, 1978

[30] Foreign Application Priority Data

Sep. 26, 1977 [JP] Japan ................................. 52-115367

[51] Int. Cl.$^3$ ........................ G08L 83/04; C08L 83/10
[52] U.S. Cl. ................... 260/37 SB; 525/474; 525/478; 525/479; 528/15; 528/31; 528/32; 427/387; 428/448
[58] Field of Search ........................... 528/15, 31, 32; 525/474, 478, 479; 260/37 SB

[56] References Cited

U.S. PATENT DOCUMENTS

| | | | |
|---|---|---|---|
| 3,989,667 | 11/1976 | Lee et al. | 528/15 |
| 4,032,502 | 6/1977 | Lee et al. | 528/31 |
| 4,061,609 | 12/1977 | Bobear | 528/15 |
| 4,082,726 | 4/1978 | Mine et al. | 528/32 |

*Primary Examiner*—Melvyn I. Marquis
*Attorney, Agent, or Firm*—John L. Young; E. Philip Koltos; Michael J. Doyle

[57] ABSTRACT

A self-bonding silicone composition comprising a vinyl-containing polysiloxane, a silicone hydride, a platinum complex catalyst and as the self-bonding additive a hydrogen containing organosilicon compound having at least one unit of the general formula

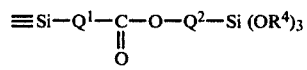

wherein $Q^1$ and $Q^2$ are alkylene radicals and $R^4$ is an alkyl radical of carbon atoms of one to four.

16 Claims, No Drawings

SELF-BONDING SILICONE COMPOSITIONS

BACKGROUND OF THE INVENTION

This Application claims priority over Japanese Patent Application Ser. No. 115367/77 filed Sept. 26, 1977.

The present invention relates to self-adhesive silicone rubber compositions curable at comparatively low temperatures and firmly adhesive to a substrate such as metal or plastics without use of any primer.

Silicone rubbers that cure through the reaction of hydrosilyl radicals and vinyl radicals attached to silicon atoms are well known. This type of silicone rubber has good heat resistance and electrical insulation. Silicone rubber of this type mixed with a filler such as silica, has self fire-extinguishing properties and has been used for potting of electrical and electronic parts and for impregnating coils.

However, these silicone rubbers, when used for potting compounds for electrical and electronic parts, have a tendency to cause corrosion or break down of insulation of the parts since they have no adhesion to the substrate permitting moisture to enter the spaces between the part and the silicone rubber.

Consequently, various types of primers have been developed to cause the silicone rubber to adhere to such electrical and electronic parts. The use of these primers, however, complicates the process since the steps of treating or drying the primers must be taken into account. Most of the primers use a solvent such as toluene, ethyl acetate, and/or alcohol which can also harm the surfaces of plastic parts or melt their paints, and they also require special precautions against their inflammability and toxicity.

On the other hand, efforts have been made to make the silicone rubber self-bonding by adding a proper constituent to the original composition when curing the silicone rubber. It has been proposed that a polysiloxane having hydrogen atoms attached to silicon and a trialkoxysilylalkyl radical be added as a third ingredient to the so-called addition reaction-type silicone rubber that forms bridges and cures by the addition reaction of polyorganosiloxane having vinyl radicals with polyorganosiloxane with hydrosilyl radicals as set forth in Japanese Pat. No. 16952, issued 1973. Also, a silane or siloxane with acryloxyalkyl radicals, and an organic peroxide are added as set forth in Japanese Pat. No. 26855, issued 1975, and further a polysiloxane having epoxy groups and/or ester groups attached to silicon atoms, and hydrogen atoms directly attached to silicon atoms, as set forth in Japanese Pat. No. 39345, issued 1975, are added to create self-bonding properties in the composition. None of these compositions exhibit sufficient self-adhesion to various types of substrates used for electrical and electronic parts.

As a result of efforts to improve these defects, it has been found that an unsaturated hydrocarbon compound with oxirane radicals added as a third ingredient to a silicone rubber composition curable by reaction of hydrosilyl radicals with alkenyl radicals attached to silicon atoms makes the composition self-bonding to a metal or plastics by heating at comparatively low temperatures for short periods of time. This method has, however, a tendency to yield unclear compositions due to poor solubility with the organopolysiloxane and oxirane compound, and to produce compositions with less self fire-extinguishing properties. Upon completion of further research, the inventors have proposed that an organopolysiloxane with oxylene radicals, trialkoxysilyl radicals, and hydrosilyl radicals be added as a third ingredient to improve these defects—See Japanese Patent Application No. 107459, 1976. This method provides excellent self-adhesion when the composition is heated at 100° C., but unsatisfactory self-adhesion at a low temperature of 70° C. so that its application is limited to the substrates or parts able to withstand a temperature of 100° C.

SUMMARY OF THE INVENTION

It has been found that an organosilicon compound having radicals of the general formula

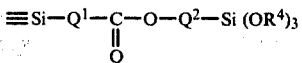

wherein $Q^1$ and $Q^2$ are an alkylene radical of straight chain or branch-chain structure, and $R^4$ is an alkyl radical having 1 to 4 carbon atoms, such compound having a hydrosilyl radical, would form an organopolysiloxane composition having sufficient self-adhesion when heated at a temperature as low as 70° C.

The invention relates to a curable, elastomeric organopolysiloxane composition consisting of:

(A) 100 parts by weight of organopolysiloxane having at least 2 units of the general formula

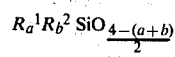

wherein $R^1$ is an alkenyl radical, $R^2$ is a substituted or nonsubstituted monovalent hydrocarbon radical with no aliphatic unsaturation, a has a value of 1 or 2, b has a value of 0, 1, or 2, and a+b has a value of 1, 2, or 3;

(B) from 0.5 to 20 parts by weight of organohydrogenpolysiloxane having one unit of the general formula

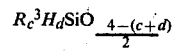

wherein $R^3$ is a substituted or nonsubstituted, monovalent hydrocarbon radical, c has a value of 0, 1, or 2, d has a value of 1 or 2, and c+d has a value of 1, 2, or 3 and at least 3 hydrogen atoms attached to silicon atoms in the molecule so that the number of hydrogen atoms attached to silicon atoms range from 0.5 to 4.0 for each $R^1$ of the organopolysiloxane (A);

(C) 1 to 10 parts by weight of organosilicon compound having in the molecule at least 1 hydrogen atom attached to the silicon atom, and at least 1 radical of the general formula

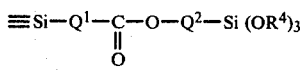

wherein $Q^1$ and $Q^2$ are an alkylene radical of straight chain or branch chain structure, and $R^4$ is an alkyl radical or 1 to 4 carbon atoms; and (D) an amount of catalyst selected from the group of platinum and platinum compounds such that the platinum amount is from 1 to 200 ppm based on the mixture.

DESCRIPTION OF THE PREFERRED EMBODIMENT

The organopolysiloxane (A) used in the invention has in the molecule at least 2 alkenyl radicals attached to the silicon atom and can be a straight chain or a branch chain structure, or a mixture thereof. Examples of $R^1$ in the above-mentioned formula are vinyl, allyl, 1-butenyl, and 1-hexenyl radicals, but the vinyl radical is preferable for its easy synthesis. Examples of $R^2$ and other organic radicals attached to the silicon atom of the siloxane unit are: an alkyl radical such as propyl, butyl, hexyl, or a dodecyl radical, an aryl radical such as a phenyl radical, and an aralkyl radical such as styrenyl or α-methylstyrenyl, and further a substituted hydrocarbon radical such as chloromethyl or 3,3,3-trifluoropropyl radical. Among these the methyl radical is preferable since it is easy to synthesize and has a polymerization degree that allows it to maintain good physical properties after curing as well as low viscosity before curing. The above unit given by:

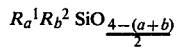

wherein $R^1$, $R^2$, a, and b are defined as above can exist at the ends or in the middle of the molecular chain of the polymer, or at both end and middle positions, but it is preferable that it exists at least at the ends in order to give the cured composition good physical properties. In order to give desired properties of the composition for molding, potting, coating, and particularly proper fluidity before curing and good physical properties after curing, the viscosity at 25° C. preferably ranges from 50 to 100,000 centipoise at and particularly from 100 to 10,000 centipoise at 25° C. Viscosities less than this range make it impossible to have sufficient elongation and elasticity after curing, and viscosities greater than this range lower operation efficiency in molding, potting, or other operations. When used as an adhesive agent curable at room temperature, compositions with viscosities greater than 10,000 cp can however be used without any trouble.

The organohydrogen polysiloxane (B) used in the invention must have at least 3 hydrogen atoms attached to the silicon atom to form the proper network structure upon curing. Examples of $R^3$ and other organic radicals attached to the silicon atom of the siloxane unit are the same as $R^2$ in the above ingredient (A), but the methyl radical is preferable for its easy synthesis. Such organohydrogenpolysiloxane can have a straight-chain, branch-chain or ring structure or a mixture thereof, but preferably is the straight or a branch-chain structure.

The following (1) through (3) structures give a cured composition with good physical properties:

(1) a branch-chain organohydrogenpolysiloxane consisting of a $(CH_3)_2HSiO_{\frac{1}{2}}$ unit and a $SiO_2$ unit, in which the amount of hydrogen atoms attached to silicon atoms range from 0.3 to 1.2 weight percent; (2) a straight-chain organohydrogenpolysiloxane given by the general formula

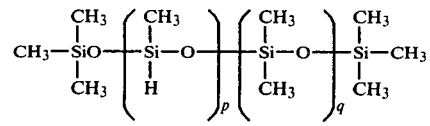

where p has a value of 3 to 100, and q has a value of 0 to 100, in which the amount of hydrogen atoms attached to silicon atoms range from 0.5 to 1.6 weight percent; and (3) a straight-chain organohydrogenpolysiloxane of the general formula

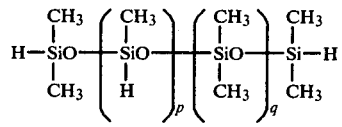

where p has a value of 1 to 100, and q has a value of 0 to 100, with the amount of hydrogen atoms attached to silicon atoms ranging from 0.5 to 1.6 weight percent.

Of these ingredients, the structure (2) is preferable in terms of easy synthesis, while in order to give the cured composition good physical properties, the structure (1) is the most preferable and the structure (3) is next.

The amount of ingredient (B) is such that the number of hydrogen atoms attached to silicon atoms in the ingredient (B) ranges from 0.5 to 4.0, preferably from 1.0 to 3.0 for each alkenyl radial in ingredient (A). A lower range of hydrogen concentrations than this prevents the composition from curing sufficiently while it decreases the hardness of the cured composition, while a higher range lowers heat-resistance and other physical properties of the cured composition.

The self-bonding organosilicon compound (C) is a necessary ingredient for the invention, since it gives the organopolysiloxane composition of the invention self-adhesion. This compound has in the molecule at least one hydrogen atom attached to the silicon atom, and, in addition, at least one radical of the general formula

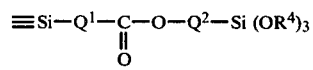

wherein $Q^1$, $Q^2$ and $R^4$ are the same as stated above, and usually is a silane or polysiloxane derivative. Preferably the compound is one having a polysiloxane frame in which Si-H bond and

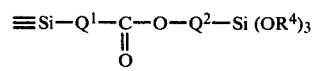

are not included in the same siloxane unit to make the synthesis easier. Because of ease of synthesis and resistance to hydrolysis, $Q^1$ is preferably a hydrocarbon radical of a carbon chain with two or more carbon atoms, particularly one given by the general formula

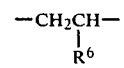

wherein $R^6$ represents a monovalent radical selected from the group of hydrogen atoms and methyl radicals. The radical $Q^2$ is preferably a hydrocarbon radical of a carbon chain with three or more carbon atoms, particularly a propylene radical because of its resistance to hydrolysis. The radical $R^4$ denotes an alkyl radical with one to four carbons such as methyl, ethyl, propyl, isopropyl, or a butyl radical, but preferably a methyl or ethyl radical since it gives good adhesion. The siloxane unit containing such a side-chain can be synthesized by adding to part of the molecule of the trialkoxysilylpropyl ester of acrylic acid or methacrylic acid. The siloxane chain of such organic silicone compounds can be a linear, cyclic or a mixture thereof, but most preferably a cyclic polysiloxane for its easy synthesis. In the case of cyclics, the siloxane ring is formed by three to six siloxane units, preferably four for easy synthesis. In the case of a linear, a larger molecular weight increases viscosity and makes synthesis or handling more dificult. Thus, the siloxane chain should be formed from two to twenty siloxane units, preferably four to ten.

The amount of ingredient (C) ranges from 1 to 10 parts by weight for 100 parts by weight of ingredient (A). Amounts less than one part by weight fail to give sufficient adhesion, and amounts greater than 10 parts by weight give poorer physical properties of the cured elastomer.

The catalyst, ingredient (D) in the invention, selected from the group of platinum and platinum compounds, accelerates an addition reaction between the alkenyl radicals in (A) and the hydrosilyl radicals of (B), and it can be a platinum, a platinum chloride, a platinum-olefin complex, a platinum-alcohol complex, or a platinum vinyl polysiloxane complex, or a platinum co-ordination compound. The amount of ingredient (D) is such that the platinum amount is in the range of from 1 to 200 ppm for ingredient (A).

The composition of the invention can have, if necessary, from 5 to 100 parts by weight based upon compound (A) of an inorganic filler added to give suitable fluidity, hardness after curing, tensile strength, or elongation for its application. Examples of the inorganic filler are a silica aerosol, silica aerogel, precipitated silica, fumed silica, ground silica, diatomaceous earth, iron oxide, zinc oxide, titanium oxide, calcium carbonate, magnesium carbonate, zinc carbonate, and carbon black. The amounts of these fillers can vary as long as the objectives of the invention can be achieved.

The composition of the invention, obtained by heating at a temperature as low as 70° C., has excellent adhesion to metal or plastics. This is apparent from the comparison of the trialkoxysilyl radials of ingredient (C), which are attached to silicon atoms through an ester bond and carbon chains at both sides thereof, with (1) those compositions having trialkoxysilyl radicals without such an ester bond but, instead, attached to silicon atoms through the carbon chain and (2) those compositions having epoxy groups attached to silicon atoms through the carbon chain or oxygen-containing carbon chain. In the case of the first, sufficient adhesion cannot be obtained, and in the case of the second better adhesion can be obtained when heated at no lower than 100° C., and no adhesion can be obtained by heating at 70° to 80° C. The composition of the invention exhibits excellent adhesion at temperatures as low as 70° to 80° C.

The composition of the invention is used for potting of electric or electronic parts and impregnating of coils, and is particularly useful for containers of low heat-resistance plastic or incorporating other low heat-resistance materials.

Examples of the invention will be described below. In the examples all parts represent parts by weight.

EXAMPLE 1

To 100 parts of dimethylvinylsilyl-end-blocked dimethyl-polysiloxane of viscosity 3,200 centistokes at 25° C., there was added 2 parts of trimethylsilyl-end-blocked methylhydrogenpolysiloxane of viscosity 15 centistokes at 25° C., 50 parts of quartz powder of average diameter 2 micron, 2 parts of titanium oxide, 0.2 parts of 1,3,5,7,-tetramethyl-1,3,5,7-tetravinylcyclotetrasiloxane, and 0.05 parts platinum in an isopropyl alcohol solution of chloroplatinic acid are mixed homogeneously, and dispersed to form a base Composition 1. The following organic silicon compounds A through D are added to 100 parts of this base composition in the amounts shown in Table 1 and mixed homogeneously to form Composition 11 of the invention and comparative compositions 12 through 14. These compositions are applied to aluminum plates and heated (a) at 150° C. for 1 hour, (b) at 100° C. for 1 hour, and (c) at 70° C. for 8 hours, respectively, to cure. The adhesions under various curing conditions are shown in Table 1.

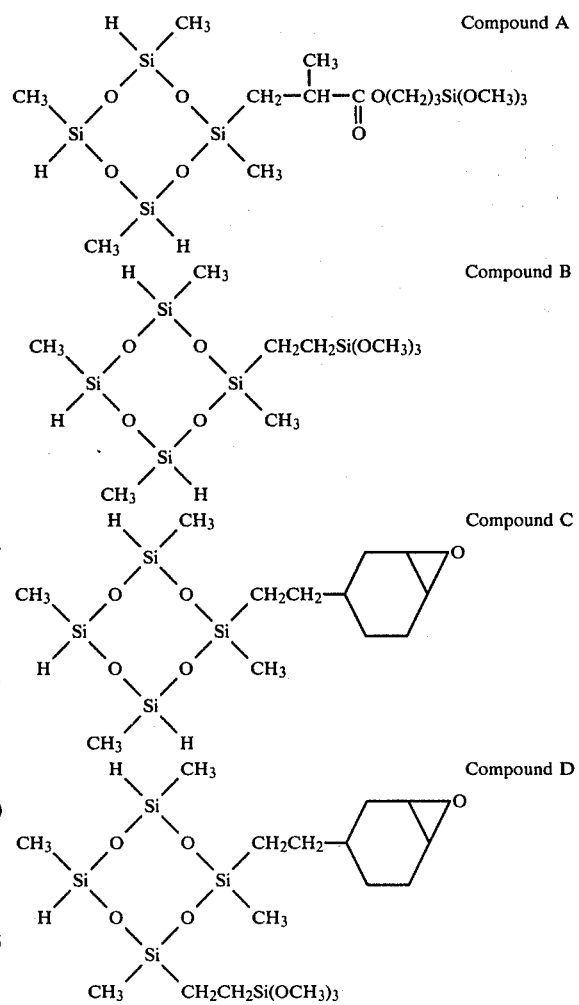

TABLE I

| | | Compositions | | | | |
|---|---|---|---|---|---|---|
| | | Invention | Comparative Examples | | | |
| Organic Silicon | | 11 | 12 | 13 | 14 | 15 |
| Organosilicon Compounds | Parts | A 3 | B 3 | C 3 | D 3 | — — |
| Adhesion | Curing Con. (a) | O | O | O | O | XX |
| | Curing Con. (b) | O | X | X | O | XX |
| | Curing Con. (c) | O | X | X | X | XX |

Note:
O : Good adhesion (unremovable)
X : Poor adhesion (removable easily)
XX : Poor adhesion (non-adhesive)

Composition 11 poured into a gap between a 2-mm thick epoxy resin plate and aluminum plate and heated at 70° C. for 8 hours to cure had a shear adhesion strength of 11.4 kg/cm² and a Cohesive Adhesion of 100%.

EXAMPLE 2

To 100 parts of dimethylvinylsilyl-endblocked dimethylpolysiloxane of a viscosity of 500 centistokes at 25° C., there was added 150 parts of quartz powder of granular diameter 5 micron, 4 parts of ferrous oxide, 0.02 parts of a platinic chloride, 0.02 parts of platinum octene complex, 3 parts of an organohydrogenpolysiloxane with a viscosity of 20 centistokes at 25° C. consisting of a $(CH_3)_2HSiO_{\frac{1}{2}}$ unit and a $SiO_2$ unit and having 0.8 weight percent of hydrogen atoms attached to silicon atoms which ingredients were mixed homogeneously to form a base composition. The organosilicon compound A used in Example 1 and the following organosilicon compounds E and F are added to 100 parts of this base composition, and mixed homogeneously to form Compositions 21 and 22 of the invention and the Comparative Composition 23. These compositions are poured into a gap between two phenol resin plates of 50 mm×25 mm×2 mm, and then heated at 90° C. for 2 hours to cure. They exhibit the adhesion for shearing shown in Table II. In addition, these compositions were molded and cured at 100° C., into sheets of 2 mm in thickness, and the physical properties as measured in accordance with JIS K6301 are also shown in Table II.

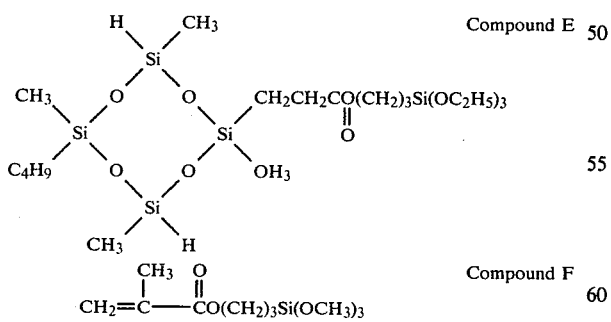

Compound E

Compound F
$$CH_2=\overset{CH_3}{\underset{|}{C}}-\overset{O}{\underset{||}{C}}O(CH_2)_3Si(OCH_3)_3$$

The shear adhesion strength and cohesion of destruction of composition 22 under curing conditions of 70° C. for 6 hours were 12.7 kg/cm² and 100%, respectively. Composition 23 was cured under the same curing conditions, but the cured composition was easily removed from the substrate with fingers.

TABLE II

| | | Invention Composition 21 | Invention Composition 22 | Comparison Composition 23 |
|---|---|---|---|---|
| Organic Si Compounds | Kind Parts | A 2.5 | E 3 | F 4 |
| Shear Adhesion Strength kg/cm² | | 17.8 | 15.0 | 5.2 |
| Cohesion Destruction % | | 100 | 100 | 80 |
| Hardness (JIS) | | 68 | 65 | 50 |
| Tensile Strength kg/cm² | | 36 | 30 | 14 |

EXAMPLE 3

To 90 parts of dimethylvinylsilyl-endblocked dimethylpolysiloxane of viscosity 5,000 centistokes at 25° C., 5 parts of organopolysiloxane consisting of 43 mole percent of a $(CH_3)_3SiO_{\frac{1}{2}}$ unit, 50 mole percent of a $SiO_2$ unit, and 7 mole percent of a $(CH_2=CH)(CH_3)SiO$ unit, 5 parts, of dimethylvinylsilyl-endblock dimethylpolysiloxane having a viscosity at 25° C. of 50,000 centistokes, 1.5 parts of fumed silica, 2.5 parts of titanium oxide, and 40 parts of ground silica of granular diameter 5 microns, and 0.2 parts of 2-ethyhexanol solution containing chloroplatinic acid of 1% concentration in platinum were mixed homogeneously to form a base composition. The amounts shown in Table III of the organosilicon Compound A used in Example 1 and the following organosilicon Compound G, and 2 parts of trimethylsilyl-endblocked methylhydrogensiloxane having a viscosity at 25° C. of 20 centistokes were added to 100 parts of this base composition and mixed homogeneously to form Compositions 31 and 32. Adhesion to various objects was tested by heating at 80° C. for 4 hours, and the shear adhesion strength as measured are shown in Table III. The cohesion for destruction was 100% in either case.

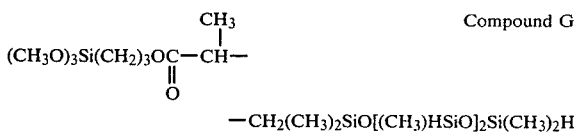

Compound G $-CH_2(CH_3)_2SiO[(CH_3)HSiO]_2Si(CH_3)_2H$

TABLE III

| | | Shearing Adhesion | |
|---|---|---|---|
| Organo | | Composition 31 | Composition 32 |
| Organic Si | Kind | A | G |
| Compounds | Parts | 3 | 3 |
| Aluminum | | 16.4 | 14.8 |
| Stainless Steel | | 14.2 | 13.8 |
| Epoxy Resin | | 12.1 | 12.5 |
| Polyester Resin | | 13.2 | 13.0 |
| Phenol Resin | | 14.5 | 13.8 |
| Polybutyreneterephthalate | | 12.0 | 12.2 |
| Melamine Resin | | 11.8 | 12.0 |
| Polyvinyl Chloride (hard type) | | 12.4 | 12.0 |

EXAMPLE 4

The vinyl group containing organopolysiloxanes as shown in Table IV were used instead of the dimethylvinylsilyl-endblocked dimethylpolysiloxane used in Example 2 to form base Compositions 2 through 4. Three parts of organosilicon Compound A used in Example 1 was added to each 100 parts of these base compositions, and mixed homogeneously to form the compositions, each of which was poured into a space between two aluminum plates of 2 mm thickness and heated at 90° C. for 3 hours, providing good adhesion.

TABLE IV

| Base Composition | Terminals | Vinyl group-containing Organopolysiloxane Siloxane Composition (Mole %) | Viscosity (25° C.) ctsk. | Parts |
|---|---|---|---|---|
| 2 | Trimethylsilyl Radicals | methylvinylsiloxane 6 Dimethylsiloxane 94 | 2,500 | 100 |
| 3 | Dimethylvinylsilyl Radicals | Diphenylsiloxane 5 Dimethylsiloxane 95 | 3,500 | 100 |
| 4 | Dimethylvinylsilyl Radicals | 3,3,3-trifluoropropyl methylsiloxane 8 Dimethylsiloxane 92 | 2,800 | 100 |

We claim:

1. A self-bonding silicone composition comprising (A) 100 parts by weight of organopolysiloxane having in the molecule at least two units of the general formula

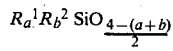

wherein $R^1$ is an alkenyl radical, $R^2$ is a substituted or non-substituted monovalent hydrocarbon radical without an aliphatic unsaturated bond, and a has a value of 1 or 2, b has a value of 0, 1, or 2, and a+b has a value of 1, 2, or 3; (B) from 0.5 to 20 parts by weight of an organohydrogenpolysiloxane having at least one unit of the general formula

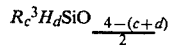

wherein $R^3$ is a substituted or non-substituted monovalent hydrocarbon radical, c has a value of 0, 1, or 2, d has a value of 1 or 2, and c+d has a value of 1, 2, or 3, and having at least three hydrogen atoms attached to silicon atoms so that the number of hydrogen atoms attached to silicon atoms for each $R^1$ of organopolysiloxane (A) is from 0.5 to 4.0; (C) from 1 to 10 parts by weight of a self-bonding organosilicon compound having in the molecule at least one hydrogen atom attached to the silicon atom and at least one unit of the general formula

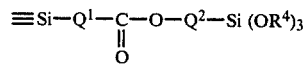

wherein $Q^1$ and $Q^2$ are linear or branched alkylene radicals and $R^4$ is an alkyl radical of carbon atoms of one to four; and (D) one to 100 ppm of platinum in the form of a platinum complex catalyst.

2. The composition as claimed in claim 1 where the organopolysiloxane (A) is given by the general formula

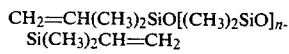

where n has a value that varies from 20 to 5,000.

3. The composition as claimed in claim 1 where the organohydrogenpolysiloxane (B) is given by the general formula

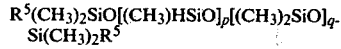

wherein $R^5$ is selected from the class consisting of hydrogen and methyl, p has a value of one to 100, and q has a value of 0 to 100.

4. The composition as claimed in claim 1 where the organohydrogenpolysiloxane (B) comprising a silicone resin having $(CH_3)_2HSiO_{\frac{1}{2}}$ units and $SiO_2$ units, with the amount of hydrogen atoms attached to silicon atoms ranging from 0.3 to 1.2 weight percent.

5. The composition as claimed in claim 1 where the self-bonding organosilicon compound has a $(CH_3)HSiO$ unit and a unit of the general formula

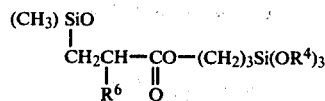

wherein $R^4$ is an alkyl radical of carbon atoms one to four, and $R^6$ is a monovalent radical selected from the group consisting of hydrogen and methyl radicals.

6. The composition of claim 5 wherein the self-bonding organosilicon compound is a cyclic polysiloxane.

7. The composition of claim 1 wherein the platinum complex catalyst is platinum complexed with a vinyl polysiloxane.

8. The composition of claim 1 wherein there is further present from 5 to 100 parts by weight of a filler in the composition selected from the class consisting of fumed silica, precipitated silica, silica aerosol, silica aerogel, ground silica, diatomaceous earth, oxidized steel, zinc oxide, titanium oxide, calcium carbonate, magnesium carbonate, zinc carbonate and carbon black.

9. A process for forming a self-bonding silicone composition comprising (1) mixing (A) 100 parts by weight of organopolysiloxane having in the molecule at least two units of the general formula

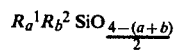

wherein $R^1$ is an alkenyl radical $R^2$ is a substituted or non-substituted monovalent hydrogen radical without an aliphatic unsaturation bond and a has a value of 1 or 2, b has a value of 0, 1, or 2 and a+b has a value of 1, 2, or 3; (B) from 0.5 to 20 parts by weight of an organohydrogenpolysiloxane having one unit of the general formula

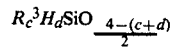

wherein $R^3$ is a substituted or non-substituted monovalent hydrocarbon radical c has a value of 0, 1, or 2, d has a value of 1 or 2, and c+d has a value of 1, 2, or 3, and having at least three hydrogen atoms attached to silicone atoms so that the number of hydrogen atoms attached to silicon atoms for each $R^1$ of organopolysiloxane is from 0.5 to 4.0; (C) from 1 to 10 parts by weight of a self-bonding organosilicon compound having in the molecule at least one hydrogen atom attached to the silicon atom and at least one unit of the general formula

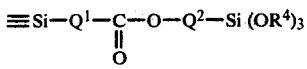

wherein $Q^1$ and $Q^2$ are alkylene radicals and $R^4$ is an alkyl radical of 1 to 4 carbon atoms and (D) one to 100 ppm of platinum in the form of a platinum complex catalyst; and (2) allowing the mixture to cure.

10. The process of claim 9 wherein the organopolysiloxane (A) is given by the general formula $$CH_2=CH(CH_3)_2SiO[(CH_3)_2SiO]_n\text{-}Si(CH_3)_2CH=CH_2$$

wherein n has a value that varies from 20 to 5,000.

11. The process as set forth in claim 9 where the organohydrogen polysiloxane (B) is given by the general formula $$R^5(CH_3)_2SiO[(CH_3)HSiO]_p[(CH_3)_2SiO]_q\text{-}Si(CH_3)_2R^5$$

wherein $R^5$ is selected from the class consisting of hydrogen and methyl, p has a value of 1 to 100, and q has a value of 0 to 100.

12. The process of claim 9 where the organohydrogen polysiloxane (B) comprises a silicone resin having $(CH_3)_2HSiO_{\frac{1}{2}}$ units and $SiO_2$ units with the amount of hydrogen atoms attached to silicon atoms ranging from 0.3 to 1.2 weight percent.

13. The process of claim 9 wherein the self-bonding organosilicon compound has $(CH_3)HSiO$ units and a unit of the general formula

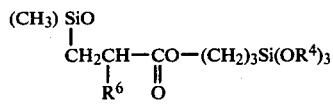

wherein $R^4$ is an alkyl radical of 1 to 4 carbon atoms and $R^6$ is a monovalent radical selected from the group consisting of hydrogen and methyl radicals.

14. A process of claim 13 wherein the self-bonding additive is a cyclic polysiloxane.

15. The process of claim 9 wherein the platinum complex catalyst is composed of platinum complexed with a vinyl polysiloxane.

16. The process of claim 1 wherein there is further present from 5 to 100 parts by weight of a filler selected from the class consisting of fumed silica, precipitated silica, silica aerosol, silica aerogel, ground silica, diatomaceous earth, oxidized steel, zinc oxide, titantium oxide, calcium carbonate, magnesium carbonate, zinc carbonate and carbon black.

* * * * *